(12) United States Patent
Vagare et al.

(10) Patent No.: US 11,544,677 B2
(45) Date of Patent: Jan. 3, 2023

(54) METHODS AND SYSTEMS FOR FACILITATING MICROSERVICES FOR CRYPTOGRAPHIC OPERATIONS

(71) Applicant: Mastercard International Incorporated, Purchase, NY (US)

(72) Inventors: Sunil Vagare, Pune (IN); Chetan Bhalerao, Pune (IN); Ritesh Chaudhari, Pune (IN); Sudhir Shirke, Pune (IN); Ashish Dhande, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 269 days.

(21) Appl. No.: 16/842,283

(22) Filed: Apr. 7, 2020

(65) Prior Publication Data

US 2020/0320489 A1  Oct. 8, 2020

(30) Foreign Application Priority Data

Apr. 8, 2019 (SG) .......................... 10201903114R

(51) Int. Cl.
| | |
|---|---|
| *G06Q 20/06* | (2012.01) |
| *G06Q 20/38* | (2012.01) |
| *H04L 9/08* | (2006.01) |
| *H04L 9/14* | (2006.01) |
| *G06F 21/72* | (2013.01) |

(52) U.S. Cl.
CPC ......... *G06Q 20/06* (2013.01); *G06Q 20/3829* (2013.01); *H04L 9/0838* (2013.01); *H04L 9/0866* (2013.01); *H04L 9/0897* (2013.01); *H04L 9/14* (2013.01); *G06Q 2220/00* (2013.01); *H04L 2209/56* (2013.01)

(58) Field of Classification Search
CPC ............... G06Q 20/06; G06Q 20/3829; G06Q 2220/00; H04L 2209/56; H04L 9/0891; H04L 9/0822
USPC .......................................................... 705/44
See application file for complete search history.

(56) References Cited

U.S. PATENT DOCUMENTS

| | | | |
|---|---|---|---|
| 9,530,011 B2 * | 12/2016 | French | H04L 9/3271 |
| 2008/0178010 A1 * | 7/2008 | Vaterlaus | H04L 63/0428 380/278 |

(Continued)

*Primary Examiner* — Clifford B Madamba
(74) *Attorney, Agent, or Firm* — Hovey Williams LLP

(57) ABSTRACT

Embodiments provide methods, and systems for facilitating microservices for cryptographic operations. A method includes receiving, by a server system, a cryptographic service request from at least one application of a plurality of applications over a network communication channel. The cryptographic service request comprises a cryptographic operation to be performed and a cryptographic keys index being an identifier of the at least one application. The method includes generating, by the server system, a cryptographic operation command for the cryptographic operation. The method includes sending, by the server system, the cryptographic operation command to a Hardware Security Module (HSM) communicatively connected to the server system to perform the cryptographic operation. The method includes receiving, by the server system, a response from the HSM for the performed cryptographic operation. The method includes sending, by the server system, the response for the performed cryptographic operation to the at least one application.

20 Claims, 12 Drawing Sheets

(56) References Cited

U.S. PATENT DOCUMENTS

| | | | |
|---|---|---|---|
| 2015/0134953 A1* | 5/2015 | Seaborn | H04L 63/0428 |
| | | | 713/168 |
| 2016/0149877 A1* | 5/2016 | Kancharla | G06F 9/45558 |
| | | | 713/171 |
| 2020/0021567 A1* | 1/2020 | Salgaonkar | H04L 9/14 |
| 2022/0191693 A1* | 6/2022 | Sullivan | H04L 9/321 |

* cited by examiner

METHODS AND SYSTEMS FOR FACILITATING MICROSERVICES FOR CRYPTOGRAPHIC OPERATIONS

CROSS REFERENCE TO RELATED APPLICATIONS

This application claims priority to Singaporean Application No. 10201903114R, filed Apr. 8, 2019, which is incorporated herein by reference in its entirety

TECHNICAL FIELD

The present disclosure relates to providing cryptographic services and, more particularly to, methods and systems for facilitating microservices for cryptographic operations to a plurality of customer applications.

BACKGROUND

In cryptography, Hardware security modules (HSMs) are physical computing devices that safeguard and manage cryptographic keys for strong authentication and provide crypto processing capabilities. Each HSM traditionally comes in the form of a plug-in card or an external device that attaches directly to an application server of an application to offload key management and crypto operations from the application server. Accordingly, each application that wishes to protect data using cryptography needs a separate HSM for performing cryptographic data operations. For example, when a user performs a cash withdrawal transaction from an ATM by entering a PIN of the payment card issued by the issuer bank, the PIN verification is performed by issuer server using the HSM assigned for the PIN verification. Additionally, there may be many other cryptographic operations to be performed during such transactions such as an Authorization Request Cryptogram (ARQC) validation, verification of credit/debit card transactions by checking card security codes, supporting a protocol of ATM network management, re-encrypting the PIN to send it to another authorization host, and the like. All such operations are performed by the respective HSMs.

Communication between the application and the HSM is very specific and it requires an interface logic that is quite complex because of the complexity of the different cryptographic operations to be performed by that interface. Furthermore, every application requires changes to support the compliances updated by the Payment Card Industry (PCI) on a periodic basis. When used in financial payments applications, the security of an HSM is often validated against the HSM requirements defined by the PCI Security Standards Council. For Management of cryptographic systems and processes, it requires in-depth knowledge of processes, procedures and audit requirements related to cryptography. There may be required a team with such expertise to do the changes that are applicable to both the application and the HSM, which is an expensive and time-consuming solution.

Also, if there comes a requirement to replace the HSM model, the corresponding changes needs to be applied in the application. This involves tremendous amount of development efforts. Also, with the frequent changes in application due to new market requirements, application may have to introduce new cryptographic functionalities. Cryptographic keys play important role for securing communications and applications. Maintenance of the cryptographic keys at the application end is another tedious task.

Accordingly, techniques are desired for performing all kinds of cryptographic operations including cryptographic keys management without having a need of a separate HSM per application.

SUMMARY

Various embodiments of the present disclosure provide systems, methods, electronic devices and computer program products for facilitating microservices for cryptographic operations.

In an embodiment, a computer-implemented method is disclosed. The method includes receiving, by a server system, a cryptographic service request from at least one application of a plurality of applications over a network communication channel. The cryptographic service request at least comprises a cryptographic operation to be performed and a cryptographic keys index. The cryptographic keys index is an identifier of the at least one application of the plurality of applications. The method includes generating, by the server system, a cryptographic operation command for the cryptographic operation. The method includes sending, by the server system, the cryptographic operation command to a Hardware Security Module (HSM) communicatively connected to the server system, the HSM configured to perform the cryptographic operation. The method includes receiving, by the server system, a response from the HSM for the performed cryptographic operation. The method includes sending, by the server system, the response for the performed cryptographic operation to the at least one application of the plurality of applications over the network communication channel.

In another embodiment, a server system is provided. The server system includes a communication interface configured to receive a cryptographic service request from at least one application of a plurality of applications over a network communication channel. The cryptographic service request at least comprises a cryptographic operation to be performed and a cryptographic keys index. The cryptographic keys index is an identifier of the at least one application of the plurality of applications. The server system includes a hardware security module configured to receive a cryptographic operation command generated for the cryptographic operation. The hardware security module is further configured to perform the cryptographic operation. The server system further includes a memory comprising executable instructions and a processor communicably coupled to the communication interface. The processor is configured to execute the instructions to cause the server system to at least receive a response from the HSM for the performed cryptographic operation. The processor is further configured to execute the instructions to cause the server system to send the response for the performed cryptographic operation to the at least one application of the plurality of applications over the network communication channel.

In yet another embodiment, a computer-implemented method is disclosed. The method includes receiving, by a payment server associated with a payment network, a cryptographic operation to be performed from an application along with a cryptographic keys index over a network communication channel. The payment server comprises a microservice core engine and one or more Hardware Security Modules (HSMs). The microservice core engine is configured to generate a cryptographic operation command for the cryptographic operation and send the cryptographic operation command to at least one HSM of the one or more HSMs. The at least one HSM of the one or more HSMs is configured to perform the cryptographic operation and send a response for the performed cryptographic operation to the microservice core engine. The method includes sending, by the payment server, the response for the performed cryptographic operation to the application over the network communication channel.

BRIEF DESCRIPTION OF THE FIGURES

For a more complete understanding of example embodiments of the present technology, reference is now made to the following descriptions taken in connection with the accompanying drawings in which.

Figure 1:
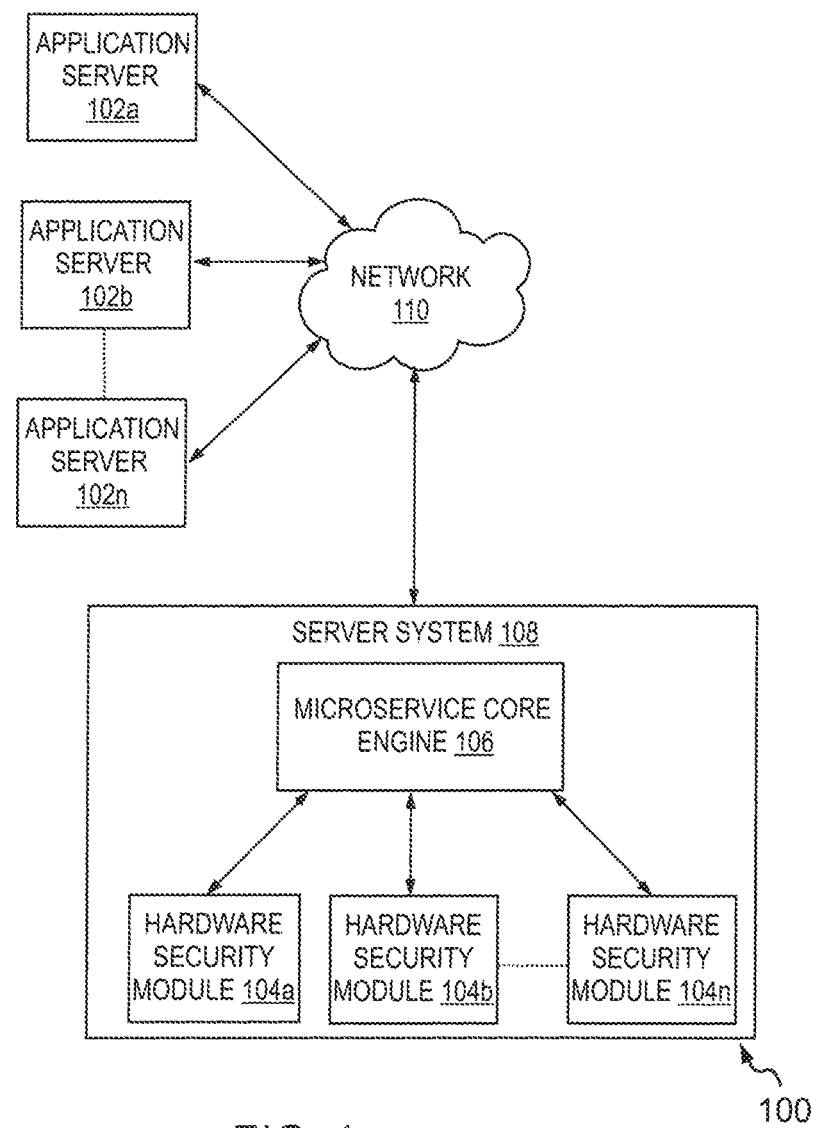
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices and computer program products for facilitating microservices for performing cryptographic operations.

In various example embodiments, the present disclosure facilitates a server system that includes a microservice core engine and one or more Hardware Security Modules (HSMs) collectively configured to provide cryptographic microservices to a plurality of customer applications. The present disclosure supports standard cryptographic calls to HSMs managed by the server system from application/storage programs or infrastructure components that utilize a cryptographic interface. The key management procedures and policies are tailored to fit particular requirements of the customer applications.

In one embodiment, the server system receives a cryptographic service request from an application (e.g., a payment application, hereinafter alternatively referred to as calling application) being a customer of the microservices provided by the server system for performing cryptographic operations. The server system is configured to authenticate the calling application prior to processing the cryptographic service request. The cryptographic service request is received over a network communication channel established between the server system and the calling application through a web service call using a Hyper Text Transfer Protocol Secure (HTTPS). The cryptographic service request includes a cryptographic operation to be performed, a cryptographic keys index being an identifier of the application (e.g., 00 for application-1, 01 for application-2 etc.) and an HSM LMK identifier. The HSM LMK identifier is shared by the server system with its customers at the time of onboarding to facilitate a corresponding HSM to a particular application for performing the cryptographic operation.

Examples of the cryptographic operations include, such as but not limited to, a Personal Identification Number (PIN) verification, a Card Verification Value (CVV) verification, an Authorization Response Code (ARC) verification, an Authorization Response Cryptogram (ARPC) generation, an Authorization Request Cryptogram (ARQC) validation, a PIN translation and testing one or more complex cryptographic functionalities of the HSM as a tester tool. Some non-limiting examples of the one or more complex cryptographic functionalities of the HSM include an AKDS, an HSM Key block, an EMV issuing script, a Payment Card Industry (PCI) Mandate, a Terminal Line Encryption (TLE), a Secure Sockets Layer (SSL) protocol, a Derived Unique Key per Transaction (DUKPT) and the like.

In an embodiment, the server system is configured to maintain one or more cryptographic keys of the calling application in a database. The cryptographic keys are identified using the cryptographic keys index belonging to the application and are fetched from the database for sending to the HSM based on the cryptographic operation to be performed. For example, if the cryptographic operation is a translation of the cryptographic keys encrypted under an old Local Master Key (LMK) to be encrypted under a new Local Master Key (LMK), the cryptographic keys encrypted under the old LMK are fetched from the database and sent to the HSM for encrypting under the new LMK. In another embodiment, the server system is configured to receive the cryptographic keys of the calling application along with the cryptographic service request from the calling application. In such scenarios, the application maintains the cryptographic keys in its own database and avails other cryptographic microservices from the server system.

In one embodiment, the server system is configured to generate a cryptographic operation command for the cryptographic operation. The cryptographic operation command is sent to a corresponding Hardware Security Module (HSM) communicatively connected to microservice core engine of the server system to perform the cryptographic operation. There may be present a plurality of HSMs or a cloud based HSM with one or more partitions of which all are allocated to each customer application, and are identified using the HSM LMK identifier received in the cryptographic service request. The cryptographic operation is performed by the dedicated HSM using the cryptographic keys either fetched from server system database or received from the application. The HSM is configured to send a response for the performed cryptographic operation to the server system. The server system, in turn, is configured to send the response for the performed cryptographic operation to the calling application.

FIG. 1 illustrates an exemplary representation of an environment 100 related to at least some example embodiments of the present disclosure. In the illustrated environment 100, a plurality of application servers such as an application server 102a, an application server 102b to an application server 102n (hereinafter referred to as application servers 102a-n) are shown. The application servers 102a-n are capable of facilitating corresponding applications (not shown) that can be installed on various client devices (not shown) through various digital platforms. The application servers 102a-n may store the respective applications and provision instances of the applications to end-users on their respective user devices/client devices. For example, the end-users may request the application server 102a to provision access to the corresponding application over a communication network 110. An instance of the application associated with the application server 102a may thereafter be downloaded on the client devices of the respective end-users in response to their request for access to the corresponding application. Alternatively, in some embodiments, the application may be factory installed within the client devices associated with the users and, as such, the users may not need to explicitly request the application from the application server 102a. Accessing the application may redirect the client device to establish a connection/session with the application server 102a for data communication.

The application servers 102a-n can take example of any server which is the administrative part of the application (not shown) and which stores data sent from the client device. In an example, the application server 102a (or the application server 102b) may be associated with a financial institution such as an "issuer bank" or "issuing bank" or simply "issuer" or simply "bank", in which a user operating the client device may have an issuer account. The application server 102a is responsible for managing information of the user. The application server 102a includes an issuer database (not shown) for maintaining information such as one or more issuer accounts of the user, transaction history related information, permanent account number (PAN) with which the one or more issuer accounts are linked, etc.

Additionally or alternatively, the application server 102b (or the application server 102c) may be associated with a merchant or a Point of Sale (POS) system network. For example, the application server 102b may be associated with an "acquirer bank" or "acquiring bank" or simply "acquirer", in which a user operating the client device may have an acquirer account.

Additional non-limiting examples of the application servers 102a-n may be a digital wallet server, a cryptographic server and a payment server managed by payment cards issuing authorities and/or a payment server associated with a payment interchange network (not shown). Examples of payment interchange network include, but are not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard is a registered trademark of Mastercard International Incorporated located in Purchase, N.Y.).

Examples of the client devices include, but are not limited to, a smartphone, a tablet, a personal digital assistant (PDA), a notebook, a POS terminal, a kiosk, an ATM or any electronic device having the capability to communicate with the application servers 102a-n via a network 110. For example, the client device may be a computer including a web browser on which an application server 102c hosts a web application, such that the application server 102c accessible to the client device using the Internet. Alternatively, the client device may be a mobile phone on which an application server 102b hosts a mobile application. Examples of the web/mobile application include a payment transaction application, a digital wallet application (e.g., Apple Pay®, Samsung Pay®, etc.) and the like. Alternatively, the client device may be a POS terminal in a payment network configured to accept user PIN for transmission to an application server 102e (e.g., an acquirer server) over the network 110.

The wallet applications or the payment transaction applications are configured to display various form fields (not shown) to be filled by the user such as a payment card number (e.g., xxxx xxxx xxxx xxxx where 'x' is an integral number) of the payment card, expiry date (e.g., MM/YY, month and year of expiry), Card Verification Value (CVV) number (e.g., *** where * is an integral number) and the like while performing an online payment transaction using a payment card. Such information needs high level of security and therefore needs to be protected using various cryptographic techniques during transmission from one entity to the other. Further, such information needs to be verified for authentication of the cardholder and his account balance to proceed the transaction. Currently, such cryptographic operations are performed by a Hardware Security Module (HSM) connected to each of the application servers 102a-n separately using a complex interface. This adds to hardware duplication and overburdening of managing cryptographic operations with adequate level of expertise needed at the application end. Further, with each new PCI security compliance, the applications need to undergo a huge amount of changes.

To remove these limitations and to provide many more cryptographic functionalities, a server system 108 is shown in communication with the application servers 102a-n over the network 110. The application servers 102a-n and the server system 108 communicate with one another via the communication network 110. The communication network 110 may be a centralized network or may comprise a plurality of sub-networks that may offer a direct communication or may offer indirect communication. Examples of the communication network 110 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 110 may be or include the Internet, intranets, extranets, microwave networks, satellite communications, cellular systems, personal communication services ("PCS"), infrared communications, global area networks, or other suitable networks, etc., or any combination of two or more such networks.

The server system 108 is shown to include a microservice core engine 106 and a plurality of HSMs such as an HSM 104a, an HSM 104b . . . an HSM 104n (hereinafter referred to as HSMs 104a-n). Each application server of the application servers 102a-n is configured to send a plurality of cryptographic service requests to the server system 108 to get a plurality of cryptographic operations performed instead of performing by themselves. The microservice core engine 106 is a processing unit of the server system 108 configured to generate commands for the HSMs 104a-n and therefore may hereinafter alternatively be referred to as the server system 108. The microservice core engine 106 may communicate with one of the HSMs 104a-n using TCP IP communication protocol or using a serial communication. In some cases, the HSMs 104a-n and the server system 108 can be a single entity i.e. embodied within a single server system. The HSMs 104a-n and the server system 108 can be example of a logical server system built on cloud computing platform. Further, the server system 108 and the HSMs 104a-n may be managed by the same entity. For example, the server system 108 and the HSMs 104a-n may be managed by a payment interchange network such as Mastercard® payment system interchange network. Alternatively, the HSM 104a-n and the server system 108 may be located at different facilities of entities managing them separately. In an embodiment, the HSMs 104a-n are tamper resistant devices.

Since the cryptographic operations are performed by the server system 108 and the cryptographic keys also can be maintained by the server system 108, the overall security and performance efficiency of the application servers 102a-n increase. Further, this solution allows a customer to consume cryptographic processing from multiple datacenters. As each application does not need to interact with a separate hardware, i.e., the HSM, they need not worry about any specification related to the hardware. Some non-exhaustive example embodiments of cryptographic microservices facilitated by the server system 108 are described with reference to the following description, particularly with reference to FIGS. 2 to 13.

Figure 2:
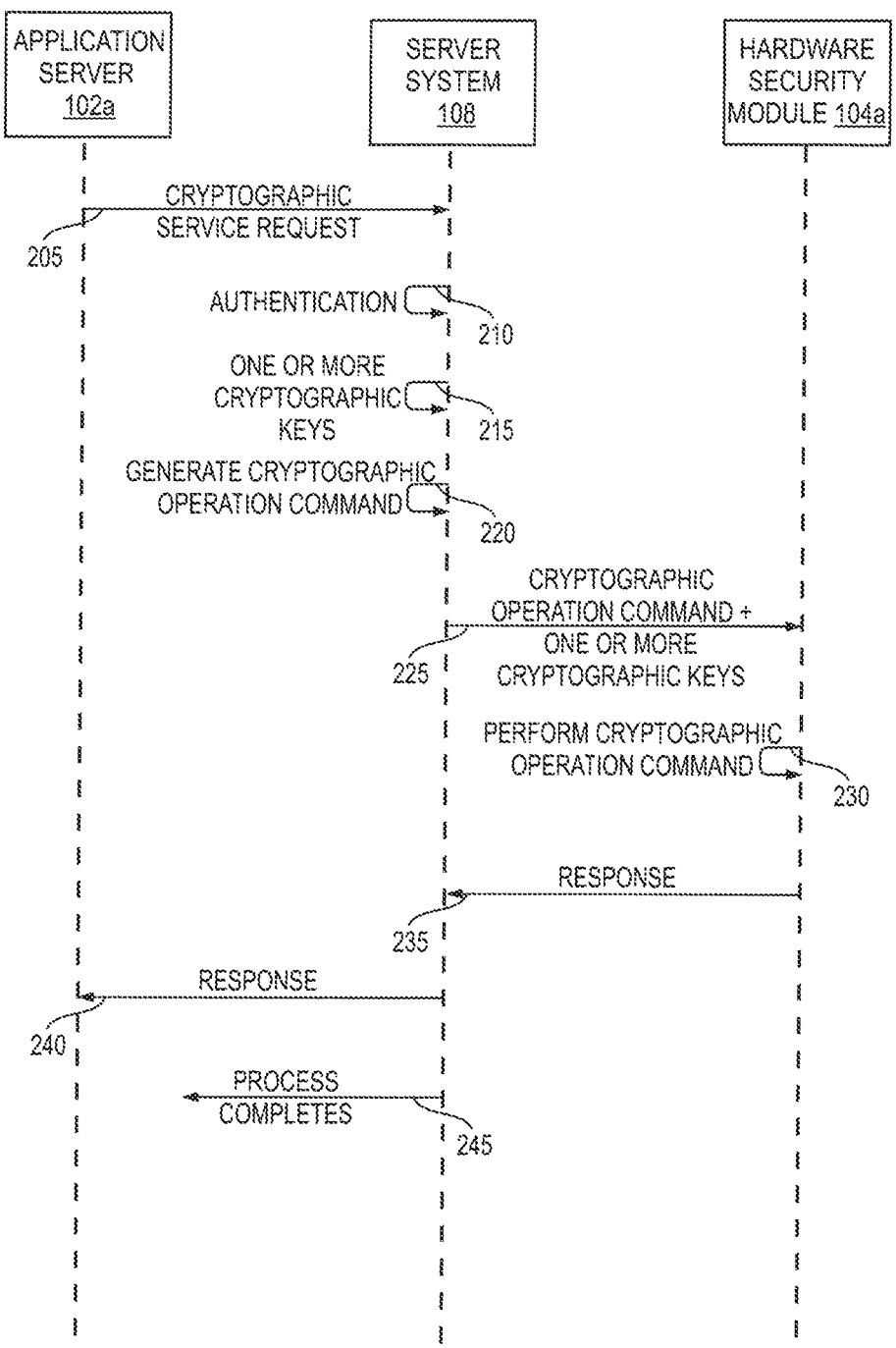
FIG. 2 represents a sequence flow diagram representing facilitation of microservices for cryptographic operations to an application by a server system, in accordance with an example embodiment.

FIG. 2 represents a sequence flow diagram 200 representing facilitation of microservices for cryptographic operations to an application from a server system, in accordance with an example embodiment. The sequence of operations of the flow diagram 200 may not be necessarily executed in the same order as they are presented. Further, one or more operations may be grouped together and performed in form of a single step, or one operation may have several sub-steps that may be performed in parallel or in sequential manner. The flow diagram 200 is explained herewith using an example application server 102a and an example HSM 104a. However, it is noted that any application server from among the plurality of application servers 102a-n and any HSM from among the plurality of HSMs 104a-n are capable of communicating with the server system 108 without deviating from the scope of the disclosure.

At 205, the server system 108 receives a cryptographic service request from the application server 102a. In an example embodiment, the communication between the application servers 102a-n and the server system 108 is implemented using HTTP. The server system 108 may include a SOAP/REST interface which receives information using a communications protocol. For example, using the Representational State Transfer (REST) protocol the applications are enabled to call a web service Application Program Interface (API) using a single universal resource locator (URL) and pass in the cryptographic service request in that URL.

Each application server is provided with a cryptographic keys index using which the server system 108 identifies the particular application server sending the cryptographic service request. The cryptographic service request also includes the cryptographic operation to be performed along with the required data on which the cryptographic operation is to be performed. For example, the cryptographic operation may be a digital signing of any type of data that is sent to the server system 108 to sign, such as a document, a fragment of XML, text-based data, or any other data that can be digitally signed. The cryptographic service request also includes an HSM LMK identifier to identify the HSM dedicated to a particular application for performing the cryptographic operation. For example, the HSM 104a is responsible for performing cryptographic operations of the application server 102a, the HSM 104b is responsible for performing cryptographic operations of the application server 102b and the like. In an example embodiment, the HSM LMK identifier is initially shared by the server system 108 with the customer application at the time of onboarding and registration.

At 210, the server system 108 performs authentication of the application server 102a prior to processing the cryptographic service request. In an example embodiment, the application is authorized using OAuth 2.0, an industry-standard protocol for authorization for web applications, desktop applications, mobile phones, and smart devices.

At 215, the server system 108 fetches one or more cryptographic keys from a database based on the cryptographic operation to be performed. For example, if the cryptographic service request includes data to be encrypted, the server system 108 would fetch applicable encryption keys generated by applying one or more encryption algorithms for performing the encryption request. Some non-exhaustive examples of the encryption keys include a terminal master key (TMK), a zonal master key (ZMK), Terminal Pin Key (TPK), Message Authentication Code (MAC) Key and the like in a context of cryptographic keys used in a payment network. Any of Pseudo Random Number Generator (PRNG) algorithms such as Lagged Fibonacci generators or linear feedback shift registers may be used to generate such keys.

At 220, the server system 108 generates the cryptographic operation command. The command includes the data required to perform the cryptographic operation. At 225, the server system 108 sends the cryptographic operation command and the fetched cryptographic keys to the HSM 104a.

At 230, HSM 104a performs the cryptographic operation using the cryptographic keys on the data received with the cryptographic command. For example, the HSM 104a decrypts a CVV number using the decryption key received from the server system 108/microservice core engine 106 and verifies it with the original CVV number or an offset of the CVV umber. The HSM 104a is configured to generate a response of the performed cryptographic operation. For example, if the CVV number decrypted using the decryption key matches with the original CVV number, the HSM 104a generates a response 'successful verification of the CVV number'.

At 235, the response is received by the server system 108. At 240, the server system 108 forwards the response to the application server 102a. For example, if the CVV number is verified, the payment transaction proceeds and the process completes at 245.

Thus, a technical effect of cryptographic operations completed using microservices facilitated by the server system 108 is a more secure, less time-consuming and more cost-effective solution than managing such cryptographic operations by the applications themselves. Further, the server system 108 ensures that the cloud or third party service provider does not have access to the cryptographic keys even when the cryptographic keys need to be revoked or updated for key rollover (e.g., translation from old LML to new LMK).

Further, the microservices can be availed by in-house applications as well as third-party applications. In-house applications may be websites or web applications that are closely controlled by the same entity (e.g., Mastercard® payment system interchange network) that also controls the server system 108. In an example embodiment, an in-house application may be a wallet application that the user interacts through the Internet entering such information as name, address, and also possibly entering more sensitive data such as credit card data. In-house application captures that data in plain text/unencrypted format. In-house application then transmits the collected data to server system 108 which manages calls to microservice core engine 106 and the HSMs 104a-n for encryption of the captured data. In-house application makes as many service calls to the server system 108 as needed to perform the cryptographic functions of the application. In this way, in-house application does not need to manage security of the data, but rather can depend on the server system 108 for those services.

Third-party applications operate similarly as in-house applications with the exception that the applications may originate as a product of third-party developers. A bank partner (e.g., an issuer server) of the entity (e.g., Mastercard® payment system interchange network) that controls the server system 108 may produce their own wallet type application, but the bank partner may not want to perform all the cryptography services themselves. The bank partner can then register to use the cryptography microservices of the server system 108 for a fee and the cryptographic operations may be facilitated using an external API gateway.

Figure 3:
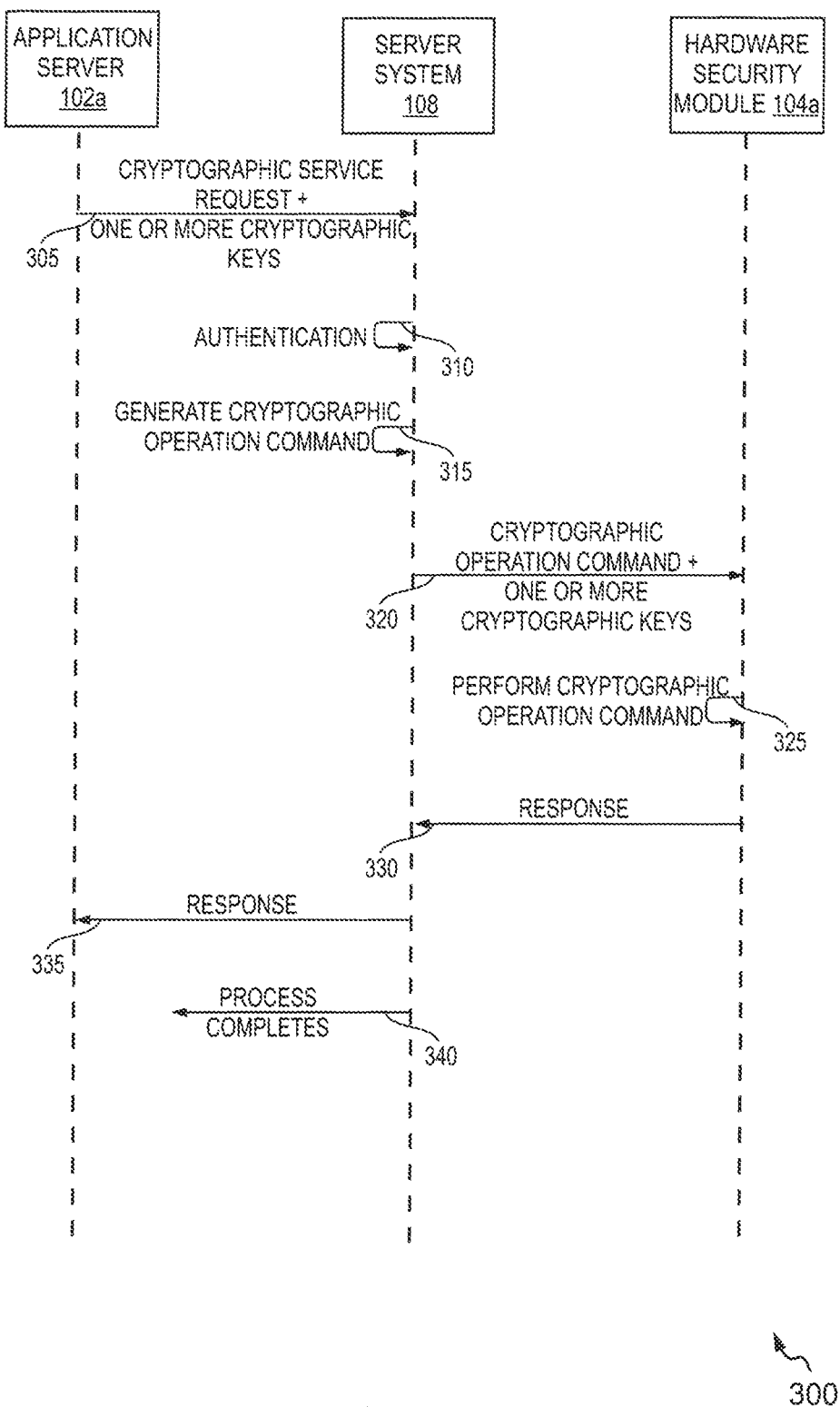
FIG. 3 represents a sequence flow diagram representing facilitation of microservices for cryptographic operations to an application by a server system, in accordance with another example embodiment.

FIG. 3 represents a sequence flow diagram 300 representing facilitation of microservices for cryptographic operations to an application from a server system, in accordance with another example embodiment. The sequence of operations of the flow diagram 300 may not be necessarily executed in the same order as they are presented. Further, one or more operations may be grouped together and performed in form of a single step, or one operation may have several sub-steps that may be performed in parallel or in sequential manner. More specifically, FIG. 3 explains the flow of operations performed in case the application servers 102a-n maintain the cryptographic keys themselves and send the service request to the server system 108 for other cryptographic operations.

At 305, the server system 108 receives a cryptographic service request from the application server 102a. The server system 108 also receives one or more cryptographic keys applicable for performing the cryptographic operation. In cloud computing, Bring Your Own Key (BYOK) allows enterprises (i.e., application servers) to encrypt their data and retain control and management of their encryption keys. The enterprises may further upload the keys to the Cloud Service Provider (CSP) infrastructure. However, in such cases, an enterprise needs to employ a tamper-resistant HSM to generate strong keys and also needs to control the secure export of its keys to the cloud, thereby requiring strong key management practices. Instead, the enterprise can opt for the key management feature of the present disclosure as explained hereinabove with reference to FIG. 2. The cryptographic service request includes a cryptographic keys index to identify the calling application, a cryptographic operation to be performed, and an HSM LMK identifier to identify the HSM dedicated to the calling application for performing the cryptographic operation.

At 310, the server system 108 performs authentication of the application server 102a prior to processing the cryptographic service request.

At 315, the server system 108 generates the cryptographic operation command. The command includes the data required to perform the cryptographic operation. At 320, the server system 108 sends the cryptographic operation command and the received cryptographic keys to the HSM 104a.

At 325, HSM 104a performs the cryptographic operation using the cryptographic keys on the data received with the cryptographic command. For example, the HSM 104a decrypts a password using the decryption key received from the application server 102a and verifies it with the original password. The HSM 104a is configured to generate a response of the performed cryptographic operation.

At 330, the response is received by the server system 108. At 335, the server system 108 forwards the response to the application server 102a. The process completes at 340.

Figure 4:
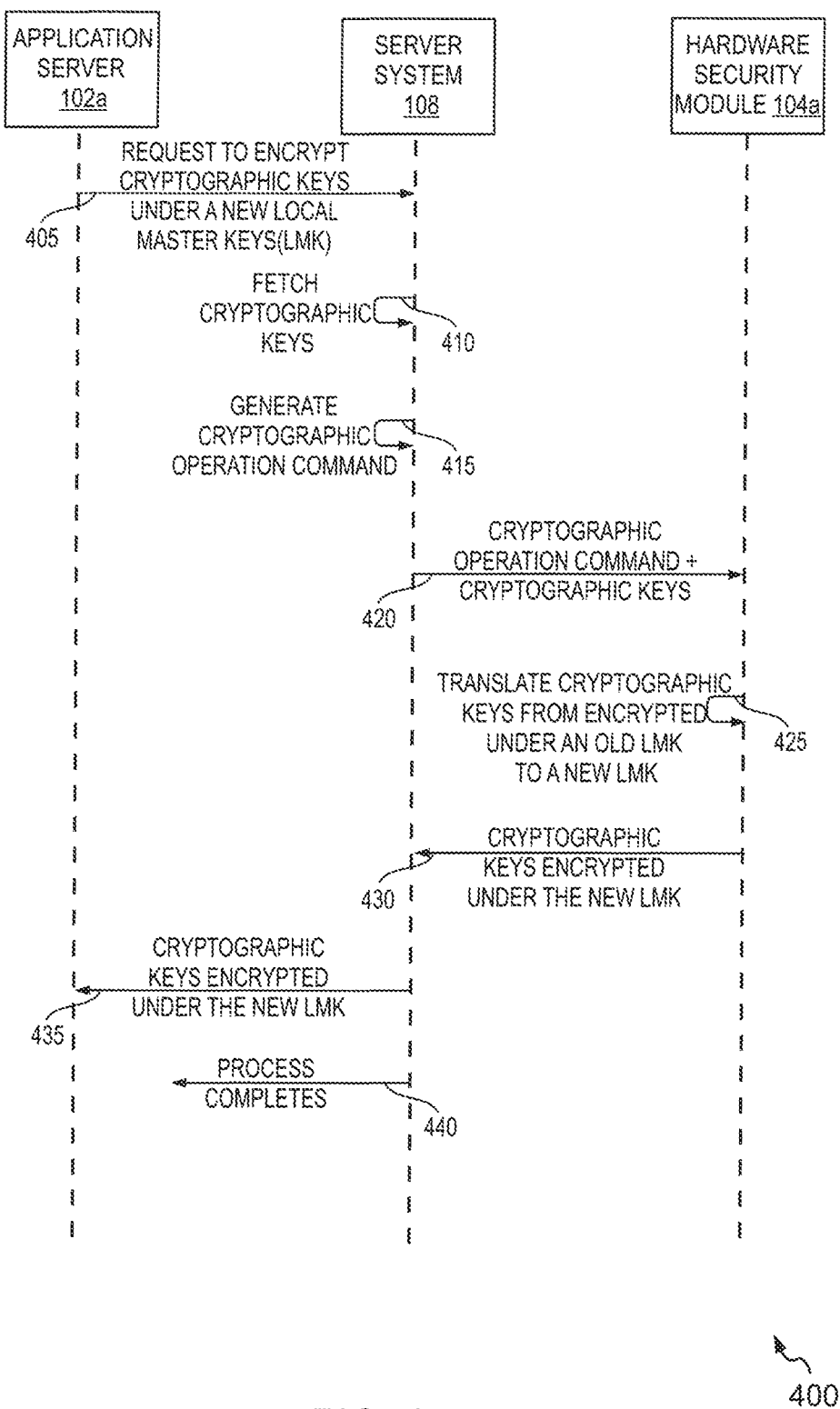
FIG. 4 represents a sequence flow diagram representing encryption of cryptographic keys under a new Local Master Key (LMK), in accordance with an example embodiment.

FIG. 4 represents a sequence flow diagram 400 representing encryption of cryptographic keys under a new Local Master Key (LMK), in accordance with an example embodiment. The sequence of operations of the flow diagram 400 may not be necessarily executed in the same order as they are presented. Further, one or more operations may be grouped together and performed in form of a single step, or one operation may have several sub-steps that may be performed in parallel or in sequential manner. More specifically, the flow diagram 400 explains an example of the cryptographic operation performed by the server system 108 by providing cryptographic microservice to the application servers 102*a-n*. Each HSM of the plurality of HSMs 104*a-n* has its own master key known as Local Master Key (LMK) (e.g., 0133456789ABCDEF). Every cryptography key is encrypted under this LMK. In an example, the HSM stores the LMK on a chip card and a clear value of the LMK cannot be known by anyone. For example, an ATM wants to have a Terminal Master Key (TMK) of 0909090909090909 stored on it. An associated HSM would receive a clear value of the TMK and obtain a cryptogram (i.e. 0909090909090909 encrypted under 0133456789ABCDEF (i.e. LMK)). The encrypted value of the TMK will be a random value such as 3F85C66266E0C409 and as nothing should be in the clear value. As per the PCI guidelines the LMK needs to be changed at a predetermined periodic interval (e.g., every two years). Migrating cryptographic keys from encrypted under an old LMK (variant LMK) to a new LMK (key block LMK) is a manual and time-consuming activity.

At 405, the server system 108 receives a cryptographic service request to encrypt one or more cryptographic keys under a new LMK from the application server 102*a*.

At 410, the server system 108 fetches the cryptographic keys from the database. The cryptographic keys for the particular application are identified using the cryptographic keys index received in the cryptographic service request.

At 415, the server system 108 generates the cryptographic operation command. At 420, the cryptographic operation command and the fetched cryptographic keys are sent to the HSM 104*a*.

At 425, the HSM 104*a* performs the cryptographic operation of translating the cryptographic keys from old LMK to new LMK. Translation includes decrypting the cryptographic keys using the old LMK stored in the HSM 104*a* and encrypting them using the new LMK generated by the HSM 104*a*.

At 430, the HSM 104*a* sends the cryptographic keys encrypted under the new LMK to the server system 108. The server system 108 updates the database with the cryptographic keys encrypted under the new LMK. At 435, the server system 108 sends the cryptographic keys encrypted under the new LMK to the application server 102*a*. The process completes at 440.

Figure 5:
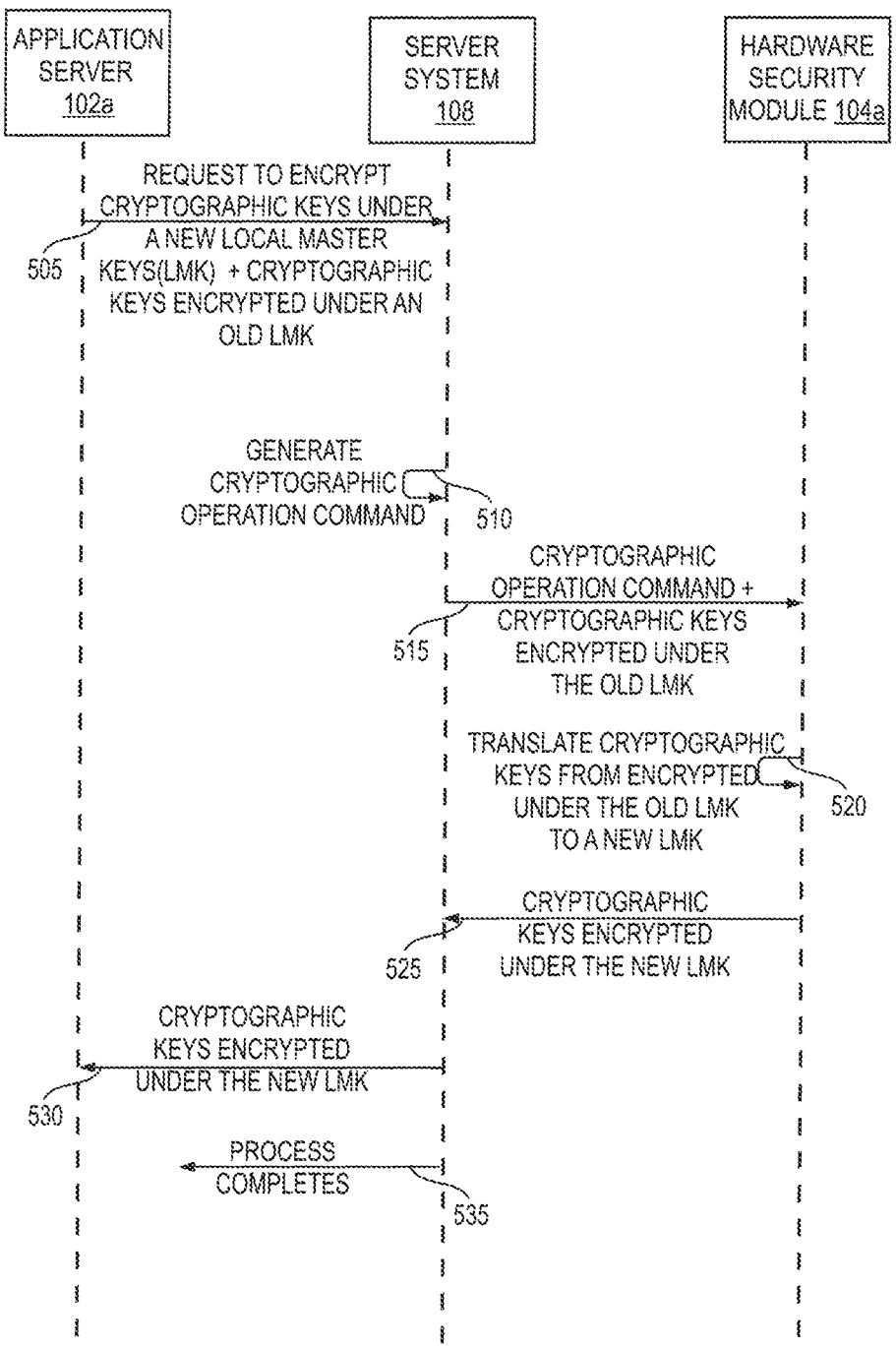
FIG. 5 represents a sequence flow diagram representing encryption of cryptographic keys under a new Local Master Key (LMK), in accordance with another example embodiment.

FIG. 5 represents a sequence flow diagram 500 representing encryption of cryptographic keys under a new Local Master Key (LMK), in accordance with another example embodiment. The sequence of operations of the flow diagram 500 may not be necessarily executed in the same order as they are presented. Further, one or more operations may be grouped together and performed in form of a single step, or one operation may have several sub-steps that may be performed in parallel or in sequential manner. More specifically, the flow diagram 500 explains an example of the cryptographic operation performed by the server system 108 by providing cryptographic microservice to the application server 102*a* in case where the cryptographic keys are maintained by the application server 102*a* itself.

At 505, the server system 108 receives a cryptographic service request to encrypt one or more cryptographic keys under a new LMK from the application server 102*a*. The server system 108 also receives the one or more cryptographic keys encrypted under an old LMK from the application server 102*a*.

At 510, the server system 108 generates the cryptographic operation command. At 515, the cryptographic operation command and the cryptographic keys encrypted under the old LMK are sent to the HSM 104*a*.

At 520, the HSM 104*a* performs the cryptographic operation of translating the cryptographic keys from old LMK to new LMK. Translation includes decrypting the cryptographic keys using the old LMK stored in the HSM 104*a* and encrypting it using the new LMK generated by the HSM 104*a*.

At 525, the HSM 104*a* sends the cryptographic keys encrypted under new LMK to the server system 108. At 530, the server system 108 sends the cryptographic keys encrypted under the new LMK to the application server 102*a*. The process completes at 535.

Figure 6:
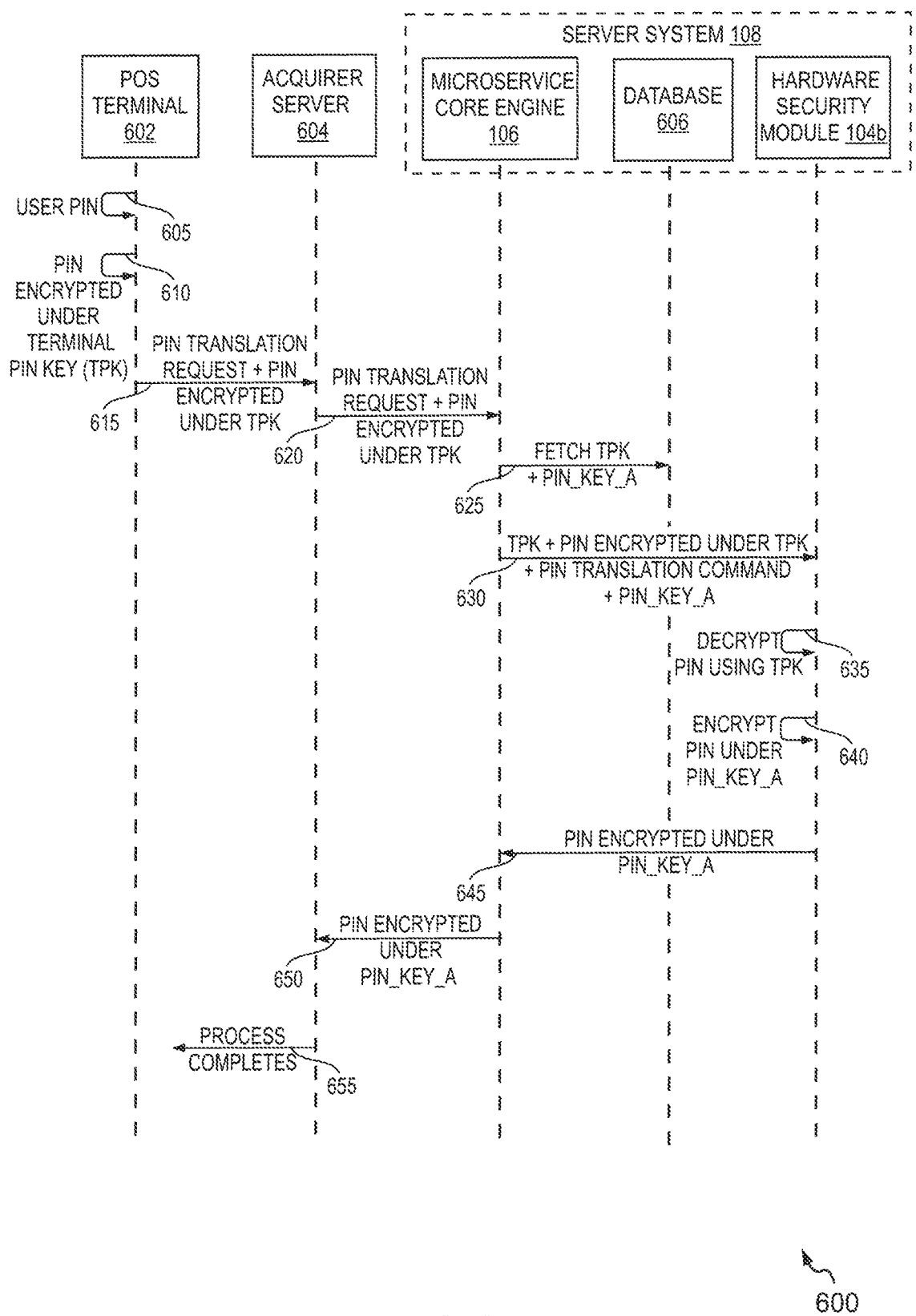
FIG. 6 represents a sequence flow diagram representing translation of a PIN during a payment transaction in a payment network, in accordance with an example embodiment.

FIG. 6 represents a sequence flow diagram 600 representing translation of a PIN during a payment transaction in a payment network, in accordance with an example embodiment. The sequence of operations of the flow diagram 600 may not be necessarily executed in the same order as they are presented. Further, one or more operations may be grouped together and performed in form of a single step, or one operation may have several sub-steps that may be performed in parallel or in sequential manner. More specifically, the flow diagram 600 explains a cryptography operation (i.e., a pin translation during a payment transaction) performed by the server system 108 on behalf of an application server being an acquirer server in a payment network. A part of a payment system is represented in which a credit/debit card user uses a payment card interchange network, such as, payment network. Examples of payment interchange network include, but not limited to, Mastercard® payment system interchange network. The payment network includes various entities such as a POS terminal 602, an acquirer server 604, a payment server (not shown) and an issuer server (not shown).

A POS terminal 602 as shown in FIG. 6 may be considered as an example of the client device. In various embodiments, a smartphone, a tablet, a personal digital assistant (PDA), a notebook, a kiosk, an ATM or any electronic device having the capability to perform Derived Unique Key per Transaction (DUKPT) based encryption can be used instead of the POS terminal 602 without deviating from the scope of the description. The acquirer server 604 is configured to host a payment application on the POS terminal 602 on which a customer/user can tender payment for a purchase from a facility such as a merchant using a payment card. The issuer server (not shown) is associated with an issuing bank in which a user may have an account (e.g., a cardholder account) and which issues a payment card, such as a credit card or a debit card, to the user. The payment card is linked to the user's account. To accept payment with the payment card, the merchant must normally establish an account with a financial institution that is part of the financial payment system. This financial institution is usually called the merchant bank or the acquirer bank. The acquirer server 604 is associated with the acquirer bank.

When the user tenders payment for a purchase with a payment card, he may need to enter a PIN (see, 605) of the payment card using the POS terminal 602. The PIN is encrypted (see, 610) under a Terminal Pin Key (TPK) by the POS terminal 602. The PIN (e.g., a four-digit number) is required to be sent by the merchant for verification to the acquirer server 604 for the processing the payment.

The POS terminal 602 sends the transaction request to the acquirer server 604 by sending the encrypted PIN under TPK (see, 615). The acquirer server 604 is required to translate the PIN encrypted under TPK to PIN_KEY_A. PIN_KEY_A is an example of the encryption key used for encrypting the PIN for transmission between the acquirer server 604 and the payment server in the payment system during the payment transaction. The translation comprises decrypting the PIN encrypted under TPK and encrypting the PIN under the PIN_KEY_A. For performing this step, the acquirer server 604 generally needs to employ a separate HSM. Instead, the acquirer server 604 can avail the cryptographic services provided by the server system 108. To achieve that, the acquirer server 604 sends a cryptographic service request of a PIN translation and the PIN encrypted under the TPK to the server system 108 (see, 620). The cryptographic service request also includes a cryptographic keys index for identifying the calling payment application. The server system 108 is shown to include the microservice core engine 106 (hereinafter alternatively referred to as core engine 106), a database 606, and an HSM 104b.

At 625, the core engine 106 fetches the TPK and the PIN_KEY_A from the database 606 using the cryptographic keys index.

At 630, the core engine 106 sends the TPK, the PIN_KEY_A, the PIN translation command and the PIN encrypted under the TPK to the HSM 104b. As the TPK and PIN_KEY_A would be encrypted under the LMK of the associated HSM 104b, only the HSM 104b would be able to read them.

At 635, the HSM 104b decrypts the PIN using the TPK. Thereafter, at 640, the HSM 104b encrypts the PIN using the PIN_KEY_A. At 645, the HSM 104b sends the PIN encrypted under the PIN_KEY_A to the core engine 106. At 650, the core engine 106 forwards the PIN encrypted under the PIN_KEY_A to the acquirer server 604. Thereafter, the process completes at 655.

In an example embodiment, the acquirer server 604 sends the PIN encrypted under PIN_KEY_A to the payment server (not shown) to proceed with the payment transaction. The payment server further needs to translate the PIN encrypted under from PIN_KEY_A to PIN_KEY_I (suitable for the issuer server). The translation includes decrypting the PIN block encrypted under PIN_KEY_A and encrypting the PIN block under the PIN_KEY_I. Similar steps as mentioned above may be performed by between the payment server and the server system 108 for PIN translation. The payment server is managed by payment cards issuing authorities and/or the payment server associated with a payment interchange network such as Mastercard® payment system interchange network which further facilitates microservices for cryptographic operations to various applications. Therefore, the PIN translation performed by the server system 108 for the payment server applies to an example of the in-house application availing the cryptographic services from the server system 108. Whereas, the PIN translation cryptographic operation performed by the server system 108 for the acquirer server 604 applies to an example of the third-party application availing the cryptographic services from the server system 108.

Similarly, the payment server sends the PIN encrypted under PIN_KEY_I to the issuer server (not shown). In order to verify the PIN, the issuer server needs to decrypt the PIN from encrypted under the PIN_KEY_I. Generally, the issuer server needs to employ an HSM to perform these tasks. Instead, the issuer server can opt for the PIN verification cryptographic operation from the server system 108. This is explained in detail hereinafter with reference to FIG. 7.

Figure 7:
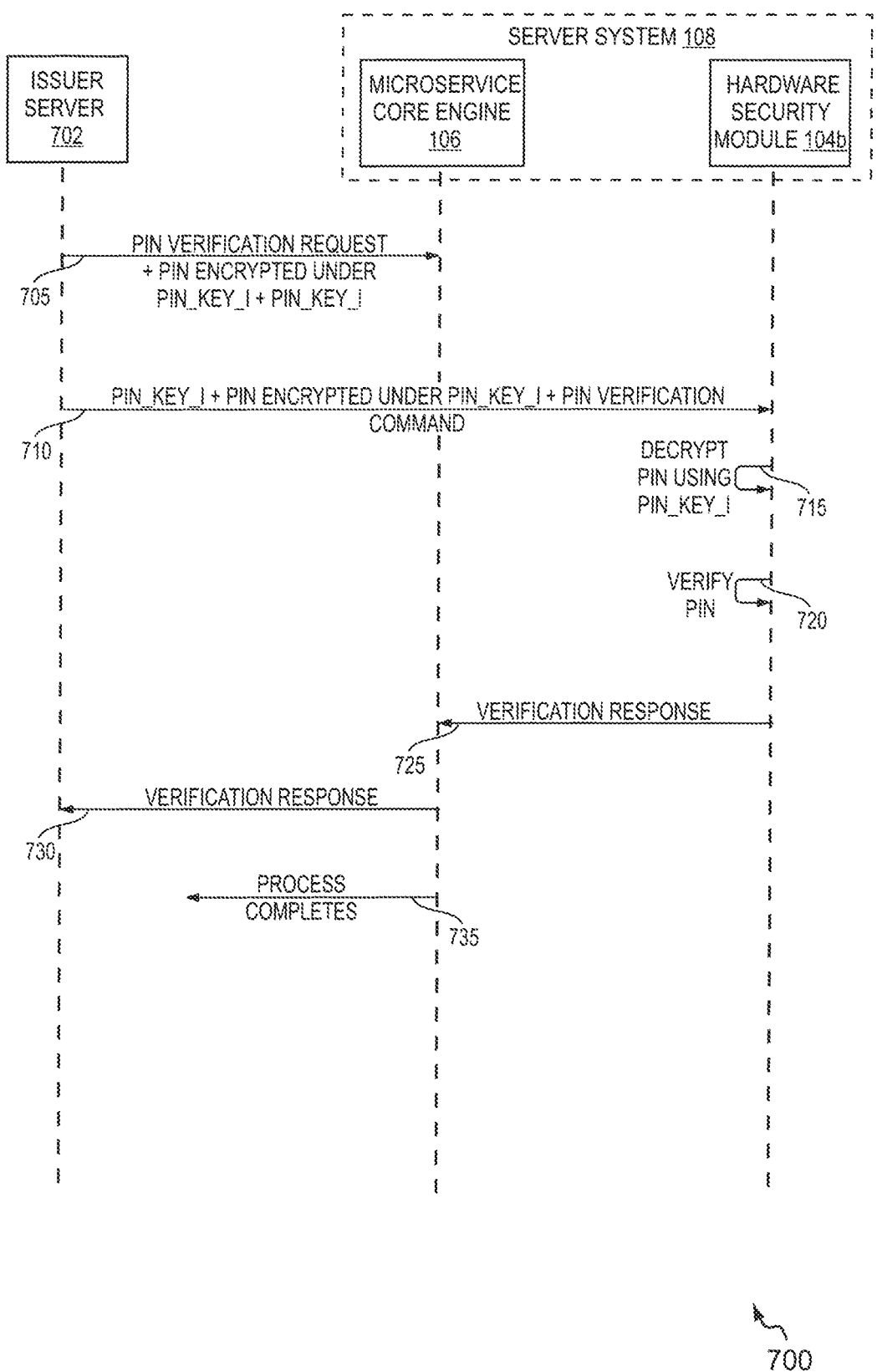
FIG. 7 represents a sequence flow diagram representing verification of a PIN during a payment transaction in a payment network, in accordance with an example embodiment.

FIG. 7 represents a sequence flow diagram 700 representing verification of a PIN during a payment transaction in a payment network, in accordance with an example embodiment. The sequence of operations of the flow diagram 700 may not be necessarily executed in the same order as they are presented. Further, one or more operations may be grouped together and performed in form of a single step, or one operation may have several sub-steps that may be performed in parallel or in sequential manner.

At 705, an issuer server 702 sends a cryptographic service request of PIN verification and a PIN encrypted under the PIN_KEY_I and the PIN_KEY_I to the server system 108. The server system 108 is shown to include only the core engine 106 and the HSM 104b. In an example, the issuer server 702 is configured to maintain the cryptographic keys by the self. Accordingly, the PIN_KEY_I is sent along with the cryptographic service request by the issuer server 702. Alternatively, the server system 108 may be capable of maintaining the cryptographic keys of the issuer server 702 as explained hereinabove with reference to FIG. 6.

At 710, The core engine 106 sends the PIN_KEY_I, the PIN verification command and the PIN encrypted under the PIN_KEY_I to the HSM 104b.

At 715, The HSM 104b decrypts the PIN using the PIN_KEY_I. Thereafter, at 720, the HSM 104b verifies the PIN using a PIN offset.

At 725, the HSM 104b sends the PIN verification response to the core engine 106. At 730, the core engine 106 forwards the PIN verification response to the issuer server 702. The process completes at 735.

In an example embodiment, the issuer server 702 notifies the payment server with the PIN verification response. The payment server forwards the response to the acquirer server 604 (FIG. 6). The acquirer server 604 forwards the response to the POS terminal 602 (FIG. 6) and upon such successful verification of the PIN, the payment transaction is completed. Thus, the technical effects of the present disclosure enable an application to use certified, high-performance Hardware Security Modules (HSMs) without employing crypto experts or buying expensive hardware and having unused capacity.

Figure 8:
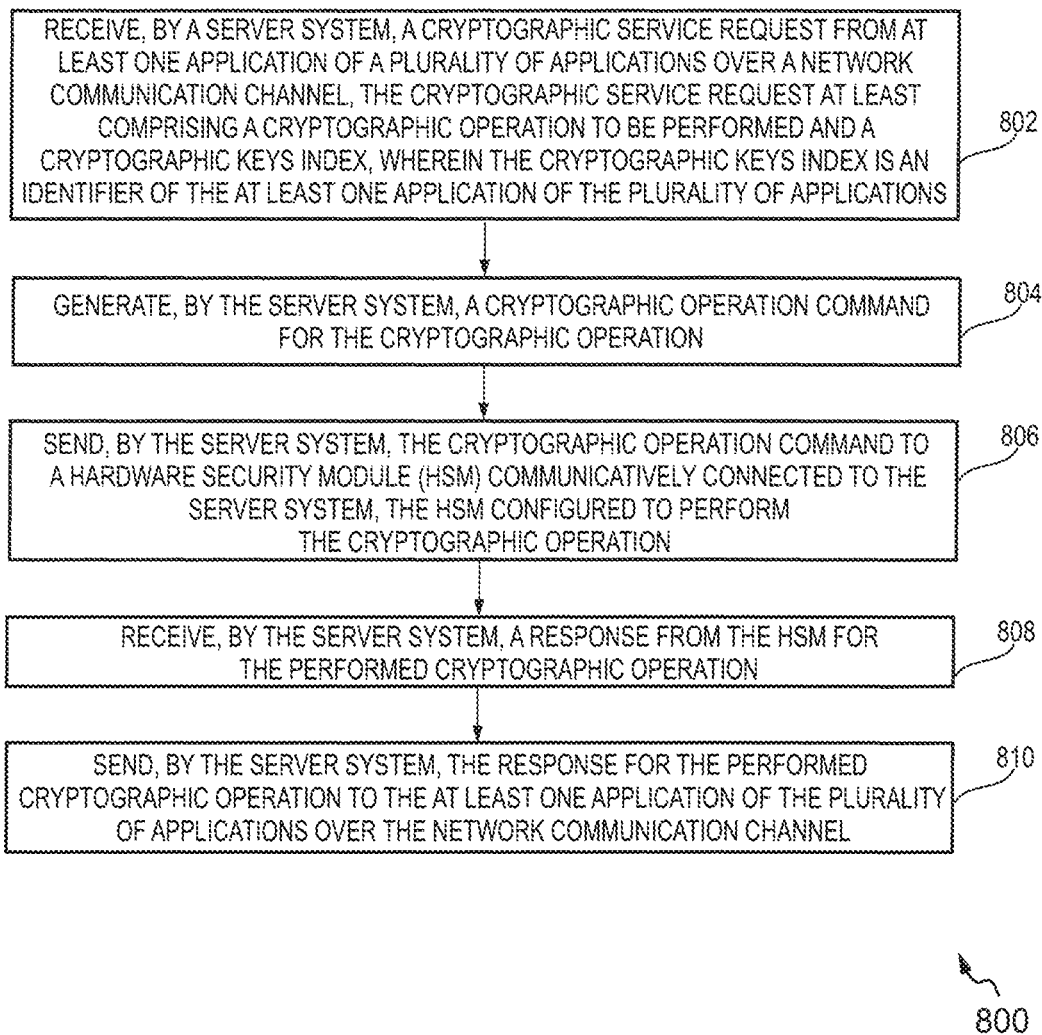
FIG. 8 illustrates a flow diagram of a method for facilitating microservices for cryptographic operations, in accordance with an example embodiment.

FIG. 8 illustrates a flow diagram of a method 800 for facilitating microservices for cryptographic operations, in accordance with an example embodiment. The method 800 depicted in the flow diagram may be executed by, for example, the at least one server system such as a payment server. Further, the server system may include an HSM for performing cryptographic operations. The Operations of the flow diagram 800, and combinations of operation in the flow diagram 800, may be implemented by, for example, hardware, firmware, a processor, circuitry and/or a different device associated with the execution of software that includes one or more computer program instructions. The method 800 starts at operation 802.

At 802, the method 800 includes receiving, by a server system, a cryptographic service request from at least one application of a plurality of applications over a network communication channel. The cryptographic service request at least includes a cryptographic operation to be performed and a cryptographic keys index. The cryptographic keys index is an identifier of the at least one application of the plurality of applications. In various example embodiments, the cryptographic operation is one of a PIN verification (as explained with reference to FIG. 7), hashing, Message Authentication Coding (MACing), MAC verification and a PIN translation (as explained with reference to FIG. 6). Further, the network communication channel established between the server system and the application is through a web service call using a Hyper Text Transfer Protocol Secure (HTTPS).

At 804, the method 800 includes, generating, by the server system, a cryptographic operation command for the cryptographic operation. In an example embodiment, the cryptographic operation is testing one or more complex cryptographic functionalities of the HSM as a tester tool. Some non-exhaustive examples of the complex cryptographic functionalities of the HSM include an AKDS, an HSM Key block, an EMV issuing script, a PCI Mandate, a Terminal Line Encryption (TLE), a Secure Sockets Layer (SSL) protocol, a Derived Unique Key per Transaction (DUKPT) and the like. For example, a customer application has its own HSM for performing cryptographic operations. The only service it needs from the server system is to do the development of Proof of Concept (POC) of the above mentioned complex cryptographic functionalities of the HSM such that the application can identify the prerequisites at very early stage. This feature can be provided by the server system as one of the microservices.

At 806, the method 800 includes sending, by the server system, the cryptographic operation command to a Hardware Security Module (HSM) communicatively connected to the server system. The HSM is configured to perform the cryptographic operation.

At 808, the method 800 includes receiving, by the server system, a response from the HSM for the performed cryptographic operation.

At 810, the method 800 includes sending, by the server system, the response for the performed cryptographic operation to the at least one application of the plurality of applications over the network communication channel. The method ends at operation 810.

Figure 9:
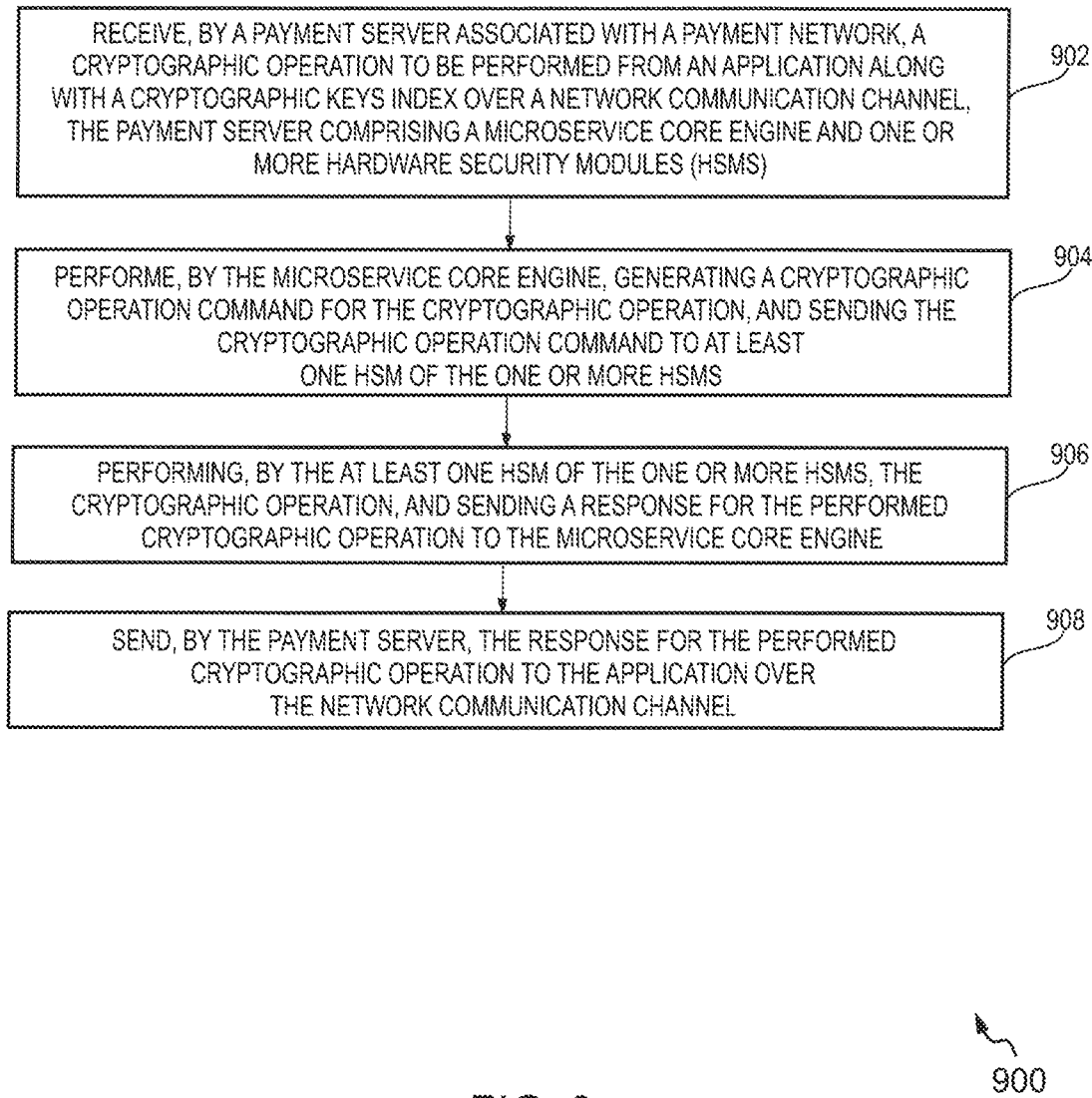
FIG. 9 illustrates a flow diagram of another method for facilitating microservices for cryptographic operations, in accordance with an example embodiment.

FIG. 9 illustrates a flow diagram of another method 900 for facilitating microservices for cryptographic operations, in accordance with an example embodiment. Operations of the method 900, and combinations of operation in the method 900, may be implemented by, for example, hardware, firmware, a processor, circuitry and/or a different device associated with the execution of software that includes one or more computer program instructions. The method 900 starts at operation 902.

At 902, the method 900 includes receiving, by a payment server associated with a payment network, a cryptographic operation to be performed from an application along with a cryptographic keys index over a network communication channel. The payment server includes a microservice core engine and one or more Hardware Security Modules (HSMs).

At 904, the method 900 includes performing, by the microservice core engine, generating a cryptographic operation command for the cryptographic operation, and sending the cryptographic operation command to at least one HSM of the one or more HSMs.

At 906, the method includes performing, by the at least one HSM of the one or more HSMs, the cryptographic operation, and sending a response for the performed cryptographic operation to the microservice core engine. In an example embodiment, one of the HSMs may include multiple partitions such that each HSM partition is dedicated to support one of the application servers/applications to offload their cryptographic operations. In another example embodiment, one of the HSMs is a multi-chip embedded Federal Information Processing Standards (FIPS) 140-compliant hardware/firmware cryptographic module.

At 908, the method 900 includes, sending, by the payment server, the response for the performed cryptographic operation to the application over the network communication channel. The method ends at operation 908.

Figure 10:
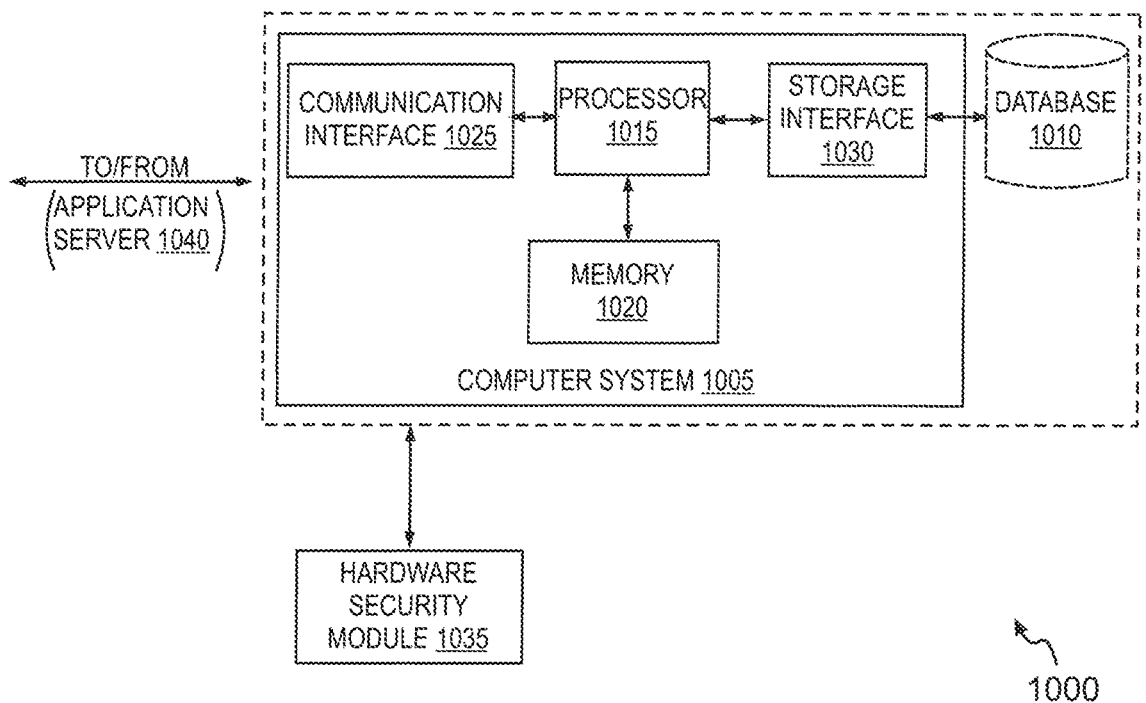
FIG. 10 is a simplified block diagram of a server system, in accordance with one embodiment of the present disclosure.

FIG. 10 is a simplified block diagram of a server system 1000, in accordance with one embodiment of the present disclosure. The server system 1000 is an example of a server system that includes the server system 108 communicatively connected to the application servers 102*a-n* of FIG. 1. Example of the server system 1000 includes a payment server in a payment network. The server system 1000 includes a computer system 1005, a database 1010 and a hardware security module (HSM) 1035. The computer system 1005 includes a processor 1015 for executing instructions. Instructions may be stored in, for example, but not limited to, a memory 1020. The processor 1015 may include one or more processing units (e.g., in a multi-core configuration). The processor 1015 is operatively coupled to a communication interface 1025 such that the computer system 1005 can communicate with an application server 1040 (that hosts an application that runs on a client device). For example, the communication interface 1025 may receive data and a cryptographic service request from the application server 1040.

The processor 1015 may also be operatively coupled to the database 1010. The database 1010 is any computer-operated hardware suitable for storing and/or retrieving data. The database 1010 may include multiple storage units such as hard disks and/or solid-state disks in a redundant array of inexpensive disks (RAID) configuration. The database 1010 may include, but not limited to, a storage area network (SAN) and/or a network attached storage (NAS) system. In some embodiments, the database 1010 is integrated within the computer system 1005. For example, the computer system 1005 may include one or more hard disk drives as the database 1010. In other embodiments, the database 1010 is external to the computer system 1005 and may be accessed by the computer system 1005 using a storage interface 1030. The storage interface 1030 is any component capable of providing the processor 1015 with access to the database 1010. The storage interface 1030 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1015 with access to the database 1010.

The database 1010 is configured to store and maintain the cryptographic keys of each customer application that the processor 1015 utilizes to provide the cryptographic microservice functionality through the API, for example, provisioning of keys, de-provisioning of keys, key derivation and the like. Further, the database 1010 is configured to store cryptographic keys indexes of the customer applications and HSM LMK identifiers. The cryptographic keys index includes an identifier key associated to a particular customer application using which the corresponding cryptographic keys of that particular application can be fetched from the database 1010.

The hardware security module (HSM) 1035 is configured to perform cryptographic operations received in cryptographic operation commands sent by the server system 1000. The HSM 1035 utilizes the cryptographic keys to perform the cryptographic operations. The HSM 1035 is an example of any of the HSM 104*a-n* described with reference to FIG. 1. The HSM 1035 is further configured to generate a response of the performed operation and send to the server system 1000. The processor 1015 is an example of the microservice core engine 106 described with reference to FIG. 1. The processor 1015 is configured to send the response generated by the HSM 1035 to the application server 1040 via the communication interface 1025. Further, the server system 1000 is configured to facilitate a UI on the client device associated with the application server 1040 using which the cryptographic service request can be sent.

The processor 1015 is also configured to authenticate the calling application before proceeding with the cryptographic service request.

In an embodiment, the communication interface 1025 is capable of facilitating operative communication with the application server 1040 using API calls. The communication may be achieved over a communication network, such as the network 110. The components of the server system 1000 provided herein may not be exhaustive, and that the server system 1000 may include more or fewer components than that of depicted in FIG. 10. Further, two or more components may be embodied in one single component, and/or one component may be configured using multiple sub-components to achieve the desired functionalities. Some components of the server system 1000 may be configured using hardware elements, software elements, firmware elements and/or a combination thereof.

Figure 11:
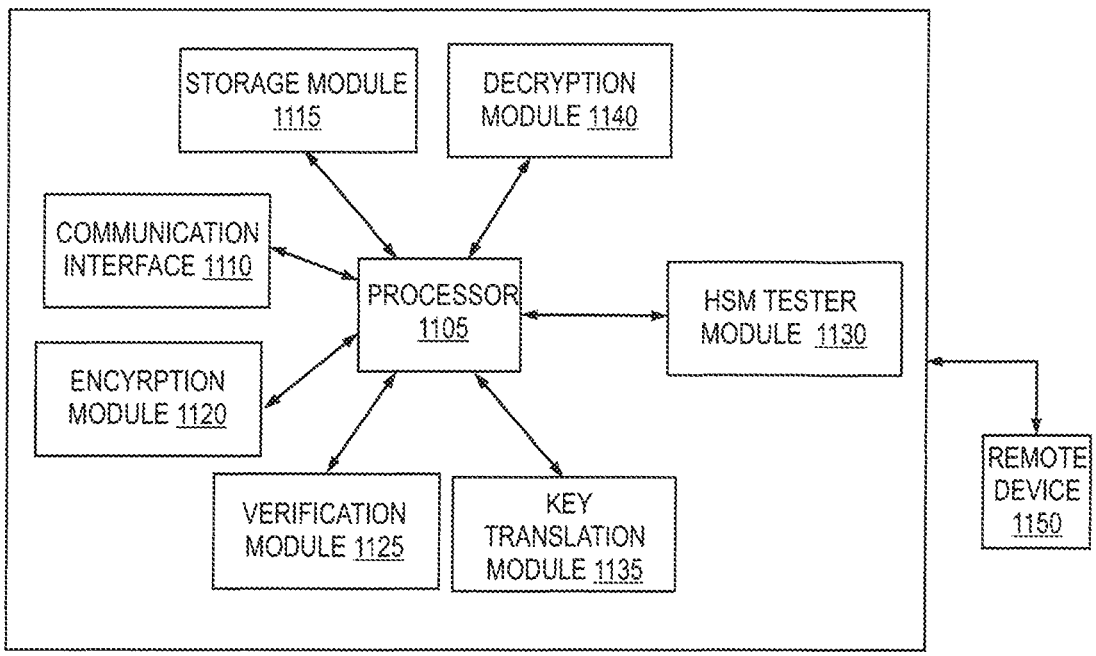
FIG. 11 is a simplified block diagram of a hardware security module, in accordance with one embodiment of the present disclosure.

FIG. 11 is a simplified block diagram of a hardware security module 1100, in accordance with one embodiment of the present disclosure. The HSM 1100 includes at least one processor 1105 communicably coupled to a communication interface 1110, a storage module 1115, an encryption module 1120, a verification module 1125, an HSM tester module 1130, a key translation module 1135, and a decryption module 1140. In at least one embodiment, the HSM 1100 may be accessible to remote devices, such as a remote device 1150 (e.g., the server system 1000), through a communication network, such as the network 110.

The processor 1105 is capable of executing the stored machine executable instructions in the storage module 1115 or within the processor 1105 or any storage location accessible to the processor 1005. The encryption module 1120 performs symmetric and asymmetric data encryption operations. The verification module 1125 verifies various session data such as PIN, CVV, login ID, password and the like using the respective session data offset. The HSM tester module 1130 is configured to provide testing of the complex functionalities of the HSM such as DUKPT, EMV issuing script and the like to identify the prerequisites at the earlier stage. The key translation module 1135 performs translation operations such as PIN translation or the translation of the cryptographic keys from old LMK to new LMK. The decryption module 1140 includes one or more decryption algorithms for decrypting the encrypted data (e.g., the PIN offset) using the encryption keys received from the remote device 1150 such as the server system 1000.

The processor 1105 is configured to include one or more cryptographic algorithms to be used by various modules of the HSM 1100. For example, the processor 1105 includes Rivest Shamir Adleman (RSA) encryption algorithm, Diffie-Hellman key agreement algorithm, Advanced Encryption Standard (AES), Data Encryption Standard (DES), Elliptic Curve Cryptography (ECC), El Gamal, Digital Signature Algorithm (DSA), Lagged Fibonacci generators, linear feedback shift registers and the like. Further, the processor 1105 is configured to perform different encryption and decryption functions such as including, but not limited to, symmetric block ciphers, padding schemes for public-key system, one-way hash functions, message authentication codes, cipher constructions based on hash functions, prime number generation and verification and the like using various modules. The processor 1105 is configured to send a response of the performed operation to the remote device 1150 such as the server system 1000 via the communication interface 1110.

In an embodiment, the processor 1105 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

In an embodiment, the HSM 1100 may include an input/output module (I/O module) (not shown) configured to receive inputs from and provide outputs to the end-user. For instance, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The storage module 1115 can be any type of storage accessible to the processor 1005. The storage module 1115 may include volatile or non-volatile memories, or a combination thereof. In some non-limiting examples, the storage module 1115 can be four to sixty-four Megabytes (MB) of Dynamic Random Access Memory ("DRAM") or Static Random Access Memory ("SRAM"). In addition, some examples may include supplementary flash memory installed via a PCMCIA slot.

Figure 12:
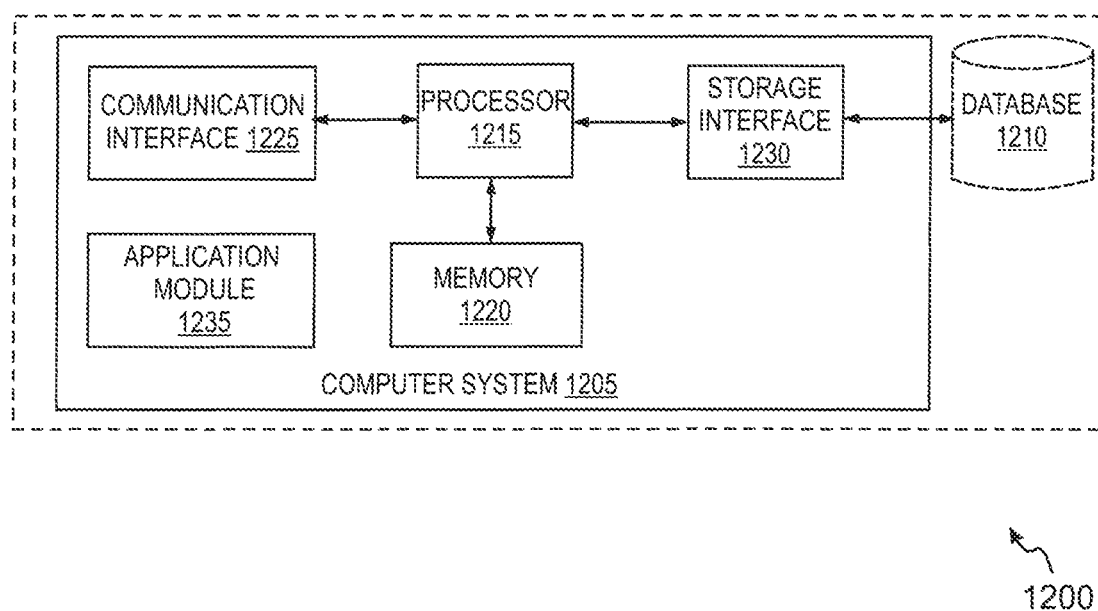
FIG. 12 is a simplified block diagram of an application server, in accordance with one embodiment of the present disclosure.

FIG. 12 is a simplified block diagram of an application server 1200, in accordance with one embodiment of the present disclosure. The application server 1200 is an example of any of the application servers 102a-n of FIG. 1. The application server 1200 includes a computer system 1205 and a database 1210. The computer system 1205 includes a processor 1215 for executing instructions. Instructions may be stored in, for example, but not limited to, a memory 1220. The processor 1215 may include one or more processing units (e.g., in a multi-core configuration). The processor 1215 is operatively coupled to a communication interface 1225 such that the computer system 1205 can communicate with a client device as well as the server system 1000. For example, the communication interface 1225 may send the cryptographic service request to the server system 1000.

The processor 1215 may also be operatively coupled to the database 1210. The database 1210 is any computer-operated hardware suitable for storing and/or retrieving data. The database 1210 may include multiple storage units such as hard disks and/or solid-state disks in a redundant array of inexpensive disks (RAID) configuration. The database 1210 may include, but not limited to, a storage area network (SAN) and/or a network attached storage (NAS) system. In some embodiments, the database 1210 is integrated within the computer system 1205. For example, the computer system 1205 may include one or more hard disk drives as the database 1210. In other embodiments, the database 1210 is external to the computer system 1205 and may be accessed by the computer system 1205 using a storage interface 1230. The storage interface 1230 is any component capable of providing the processor 1215 with access to the database 1210. The storage interface 1230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1215 with access to the database 1210. In an embodiment, the database 1210 is configured to store the cryptographic keys required to perform the cryptographic operations and the processor 1215 is configured to send the cryptographic keys to the server system 1000 via the communication interface 1225.

The computer system 1205 further includes an application module 1235. The application module 1235 is configured to implement features of the application on the client device upon installation. As an example, the application may be a payment transaction application. The application module 1235 may be configured to receive payment transaction related information and user information from the client device. The application module 1235 further sends response to the payment transaction related information and the user information to the client device.

The communication interface 1225 is further configured to cause display of user interfaces on the client device using which the user may initiate a payment transaction. In one embodiment, the communication interface 1225 includes a transceiver for wirelessly communicating information to, or receiving information from, the server system 1000 or other suitable display device, and/or another type of remote processing device. In another embodiment, the communication interface 1225 is capable of facilitating operative communication with the remote devices and a cloud server using Application Program Interface (API) calls. The communication may be achieved over a communication network, such as the network 110.

Figure 13:
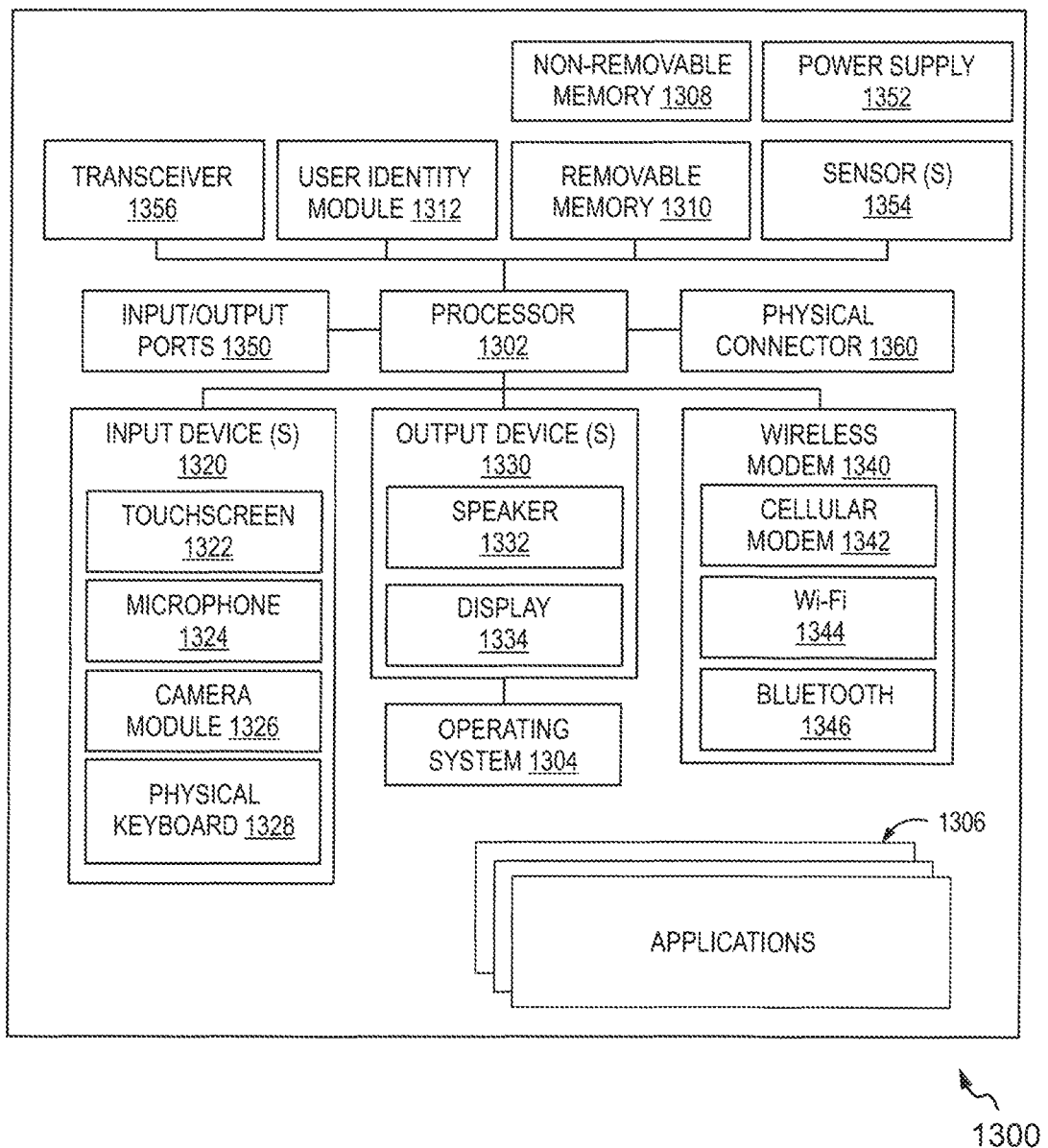
FIG. 13 shows simplified block diagram of a client device capable of implementing at least some embodiments of the present disclosure.

FIG. 13 shows simplified block diagram of a client device 1300 capable of implementing at least some embodiments of the present disclosure. For example, the client device 1300 may run the application hosted by the application server 1200 of FIG. 12. The client device 1300 is depicted to include one or more applications 1306.

It should be understood that the client device 1300 as illustrated and hereinafter described is merely illustrative of one type of device and should not be taken to limit the scope of the embodiments. As such, it should be appreciated that at least some of the components described below in connection with that the client device 1300 may be optional and thus in an example embodiment may include more, less or different components than those described in connection with the example embodiment of the FIG. 13. As such, among other examples, that the client device 1300 could be any of a mobile electronic device, for example, ATMs, kiosks, cellular phones, tablet computers, laptops, mobile computers, personal digital assistants (PDAs), mobile televisions, mobile digital assistants, or any combination of the aforementioned, and other types of communication or multimedia devices.

The illustrated client device 1300 includes a controller or a processor 1302 (e.g., a signal processor, microprocessor, ASIC, or other control and processing logic circuitry) for performing such tasks as signal coding, data processing, image processing, input/output processing, power control, and/or other functions. An operating system 1304 controls the allocation and usage of the components of the client device 1300 and support for one or more applications programs (see, the applications 1306), that implement one or more of the innovative features described herein. The applications 1306 may include payment-based application and/or any common mobile computing applications (e.g., telephony applications, email applications, calendars, contact managers, web browsers, messaging applications) or any other computing application.

The illustrated client device 1300 includes one or more memory components, for example, a non-removable memory 1308 and/or a removable memory 1310. The non-removable memory 1308 and/or the removable memory 1310 may be collectively known as database in an embodiment. The non-removable memory 1308 can include RAM, ROM, flash memory, a hard disk, or other well-known memory storage technologies. The removable memory 1310 can include flash memory, smart cards, or a Subscriber Identity Module (SIM). The one or more memory components can be used for storing data and/or code for running the operating system 1304 and the applications 1306. The client device 1300 may further include a user identity module (UIM) 1312. The UIM 1312 may be a memory device having a processor built in. The UIM 1312 may include, for example, a subscriber identity module (SIM), a universal integrated circuit card (UICC), a universal subscriber identity module (USIM), a removable user identity module (R-UIM), or any other smart card. The UIM 1312 typically stores information elements related to a mobile subscriber. The UIM 1312 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The client device 1300 can support one or more input devices 1320 and one or more output devices 1330. The input devices 1320 and the output devices 1330 configure the input/output (I/O) module for the client device 1300. Examples of the input devices 1320 may include, but are not limited to, a touch screen/a display screen 1322 (e.g., capable of capturing finger tap inputs, finger gesture inputs, multi-finger tap inputs, multi-finger gesture inputs, or keystroke inputs from a virtual keyboard or keypad), a microphone 1324 (e.g., capable of capturing voice input), a camera module 1326 (e.g., capable of capturing still picture images and/or video images) and a physical keyboard 1328. Examples of the output devices 1330 may include, but are not limited to a speaker 1332 and a display 1334. Other possible output devices can include piezoelectric or other haptic output devices. Some devices can serve more than one input/output function. For example, the touch screen 1322 and the display 1334 can be combined into a single input/output device.

A wireless modem 1340 can be coupled to one or more antennas (not shown in the FIG. 12) and can support two-way communications between the processor 1302 and external devices, as is well understood in the art. The wireless modem 1340 is shown generically and can include, for example, a cellular modem 1342 for communicating at long range with the mobile communication network, a Wi-Fi compatible modem 1344 for communicating at short range with an external Bluetooth-equipped device or a local wireless data network or router, and/or a Bluetooth-compatible modem 1346. The wireless modem 1340 is typically configured for communication with one or more cellular networks, such as a GSM network for data and voice communications within a single cellular network, between cellular networks, or between the client device 1300 and a public switched telephone network (PSTN). The wireless modem 1340 may in at least one example embodiment configure the communication module of the client device 1300.

The client device 1300 can further include one or more input/output ports 1350, a power supply 1352, one or more sensors 1354 for example, an accelerometer, a gyroscope, a compass, or an infrared proximity sensor for detecting the orientation or motion of the client device 1300, a transceiver 1356 (for wirelessly transmitting analog or digital signals) and/or a physical connector 1360, which can be a USB port, IEEE 1294 (FireWire) port, and/or RS-232 port. The illustrated components are not required or all-inclusive, as any of the components shown can be deleted and other components can be added.

The disclosed method with reference to FIGS. 8 and 9, or one or more operations of the methods 800 and 900 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1000 and its various components such as the computer system 1005 and the database 1010 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
  receiving, by a server system, a cryptographic service request from at least one application of a plurality of applications over a network communication channel, the cryptographic service request comprising a cryptographic operation to be performed, a Hardware Security Module Local Master Key (HSM LMK) identifier, and a cryptographic keys index, wherein the cryptographic keys index is an identifier of the at least one application and the HSM LMK identifier is an identifier of an HSM dedicated to the at least one application for performing the cryptographic operation;
  generating, by the server system, a cryptographic operation command to perform the cryptographic operation;
  sending, by the server system, the cryptographic operation command to the HSM identified by the HSM LMK identifier, the HSM configured to perform the cryptographic operation;

receiving, by the server system, a response from the HSM, the response indicative of a result of the performed cryptographic operation; and sending, by the server system, the response to the at least one application over the network communication channel.

2. The method as claimed in claim 1, further comprising:

maintaining one or more cryptographic keys of the at least one application of the plurality of applications in a database, the one or more cryptographic keys identified using the cryptographic keys index received in the cryptographic service request;

fetching the one or more cryptographic keys based on the cryptographic operation to be performed;

sending the fetched one or more cryptographic keys along with the cryptographic operation command to the HSM; and receiving the response from the HSM for the performed cryptographic operation, the cryptographic operation performed by the HSM the using the one or more cryptographic keys.

3. The method as claimed in claim 2, wherein for the cryptographic operation being a translation of the one or more cryptographic keys from encrypted under an old Local Master Key (LMK) to be encrypted under a new Local Master Key (LMK), further comprising:

fetching the one or more cryptographic keys from the database;

sending the one or more cryptographic keys to the HSM for encrypting under the new LMK; and sending the one or more cryptographic keys encrypted under the new LMK to the at least one application.

4. The method as claimed in claim 1, further comprising:

receiving one or more cryptographic keys of the at least one application of the plurality of applications along with the cryptographic service request;

sending the one or more cryptographic keys along with the cryptographic operation command to the HSM; and receiving the response from the HSM for the performed cryptographic operation, the cryptographic operation performed by the HSM the using the one or more cryptographic keys.

5. The method as claimed in claim 4, wherein for the cryptographic operation being a translation of the one or more cryptographic keys from encrypted under an old Local Master Key (LMK) to be encrypted under a new Local Master Key (LMK), further comprising:

receiving the one or more cryptographic keys encrypted under the old LMK along with the cryptographic service request;

sending the one or more cryptographic keys encrypted under the old LMK to the HSM for encrypting under the new LMK; and sending the one or more cryptographic keys encrypted under the new LMK to the at least one application.

6. The method as claimed in claim 1, wherein the cryptographic operation is one of a Personal Identification Number (PIN) verification, a Card Verification Value (CVV) verification, an Authorization Response Code (ARC) verification, an Authorization Response Cryptogram (ARPC) generation, an Authorization Request Cryptogram (ARQC) validation and a PIN translation.

7. The method as claimed in claim 1, wherein the cryptographic operation comprises testing one or more complex cryptographic functionalities of the HSM as a tester tool and wherein the one or more complex cryptographic functionalities of the HSM are one of an AKDS, an HSM Key block, an EMV issuing script, a Payment Card Industry (PCI) Mandate, a Terminal Line Encryption (TLE), a Secure Sockets Layer (SSL) protocol, and a Derived Unique Key per Transaction (DUKPT).

8. The method as claimed in claim 1, further comprising:

authenticating the at least one application prior to processing the cryptographic service request.

9. The method as claimed in claim 1, wherein the HSM LMK identifier is initially shared by the server system with the at least one application of the plurality of applications.

10. A server system, the server system comprising:

a communication interface;

a memory comprising executable instructions;

a hardware security module (HSM) identified by a Hardware Security Module Local Master Key (HSM LMK) identifier, the HSM configured to:

receive a cryptographic operation command generated to perform a cryptographic operation, perform the cryptographic operation in response to receiving the cryptographic operation command, generate a response indicative of a result of the performed cryptographic operation; and a processor communicably coupled to the communication interface, the memory, and the HSM, the processor configured to execute the instructions to cause the processor to at least:

receive, via the communication interface, a cryptographic service request from at least one application of a plurality of applications over a network communication channel, the cryptographic service request comprising the cryptographic operation to be performed, the HSM LMK identifier, and a cryptographic keys index, wherein the cryptographic keys index is an identifier of the at least one application, wherein the HSM is dedicated to the at least one application for performing the cryptographic operation, generate the cryptographic operation command to perform the cryptographic operation, transmit, via the communication interface, the cryptographic operation command to the HSM, receive, via the communication interface, the response from the HSM for the performed cryptographic operation, and send, via the communication interface, the response to the at least one application over the network communication channel.

11. The server system as claimed in claim 10, wherein the processor is further caused to:

maintain one or more cryptographic keys of the at least one application of the plurality of applications in a database, the one or more cryptographic keys identified using the cryptographic keys index received in the cryptographic service request;

fetch the one or more cryptographic keys based on the cryptographic operation to be performed;

send the fetched one or more cryptographic keys along with the cryptographic operation command to the HSM; and receive the response from the HSM, the cryptographic operation performed by the HSM the using the one or more cryptographic keys.

12. The server system as claimed in claim 11, wherein for the cryptographic operation being a translation of the one or more cryptographic keys from encrypted under an old Local Master Key (LMK) to be encrypted under a new Local Master Key (LMK), the processor is further caused to:

fetch the one or more cryptographic keys from the database;

send the one or more cryptographic keys to the HSM for encrypting under the new LMK; and send the one or more cryptographic keys encrypted under the new LMK to the at least one application.

13. The server system as claimed in claim 10, wherein the processor is further caused to:

receive one or more cryptographic keys of the at least one application of the plurality of applications along with the cryptographic service request;

send the one or more cryptographic keys along with the cryptographic operation command to the HSM; and receive the response from the HSM for the performed cryptographic operation, the cryptographic operation performed by the HSM the using the one or more cryptographic keys.

14. The server system as claimed in claim 13, wherein for the cryptographic operation being a translation of the one or more cryptographic keys from encrypted under an old Local Master Key (LMK) to be encrypted under a new Local Master Key (LMK), the processor is further caused to:

receive the one or more cryptographic keys encrypted under the old LMK along with the cryptographic service request;

send the one or more cryptographic keys encrypted under the old LMK to the HSM for encrypting under the new LMK; and send the one or more cryptographic keys encrypted under the new LMK to the at least one application.

15. The server system as claimed in claim 10, wherein the cryptographic operation comprises one of: a Personal Identification Number (PIN) verification; a Card Verification Value (CVV) verification; an Authorization Response Code (ARC) verification; an Authorization Response Cryptogram (ARPC) generation; an Authorization Request Cryptogram (ARQC) validation; and a PIN translation.

16. The server system as claimed in claim 10, wherein the cryptographic operation comprises testing one or more complex cryptographic functionalities of the HSM as a tester tool and wherein the one or more complex cryptographic functionalities of the HSM are one of: an AKDS; an HSM Key block; an EMV issuing script; a Payment Card Industry (PCI) Mandate; a Terminal Line Encryption (TLE); a Secure Sockets Layer (SSL) protocol; and a Derived Unique Key per Transaction (DUKPT).

17. The server system as claimed in claim 10, wherein processor is further caused to:

authenticate the at least one application prior to processing the cryptographic service request.

18. The server system as claimed in claim 10, wherein the HSM LMK identifier is initially shared by the processor, via the communications interface, with the at least one application of the plurality of applications.

19. A computer-implemented method, comprising:

receiving, from an application by a payment server associated with a payment network, a cryptographic operation to be performed, a Hardware Security Module Local Master Key (HSM LMK) identifier, and cryptographic keys index over a network communication channel, the payment server comprising a microservice core engine and one or more Hardware Security Modules (HSMs), wherein the HSM LMK identifier is an identifier of a selected HSM of the one or more HSMs that is dedicated to the application for performing the cryptographic operation;

generating, by the microservice core engine, a cryptographic operation command to perform the cryptographic operation, sending, by the microservice core engine, the cryptographic operation command to the HSM identified by the HSM LMK identifier;

performing, by the identified HSM, the cryptographic operation, sending, by the identified HSM, a response to the microservice core engine, the response being indicative of a result of the performed cryptographic operation; and sending, by the payment server, the response to the application over the network communication channel.

20. The method as claimed in claim 19, wherein the network communication channel established between the payment server and the application is through a web service call using a Hyper Text Transfer Protocol Secure (HTTPS).

* * * * *